No. 800,112. PATENTED SEPT. 19, 1905.
J. W. JONES.
TIRE FOR VEHICLE WHEELS.
APPLICATION FILED DEC. 30, 1904.
2 SHEETS—SHEET 1.
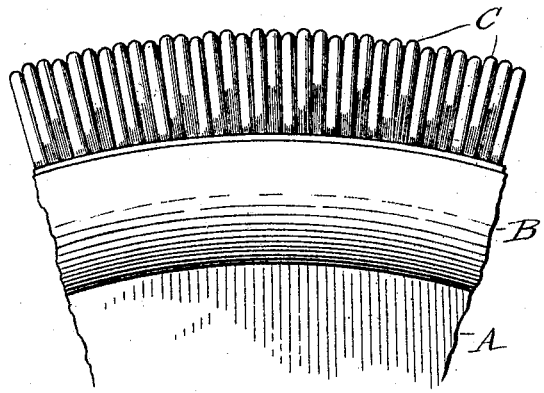
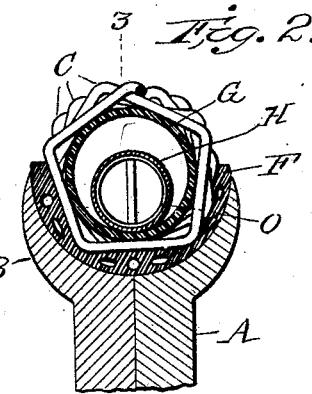
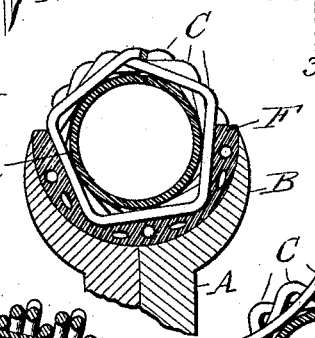
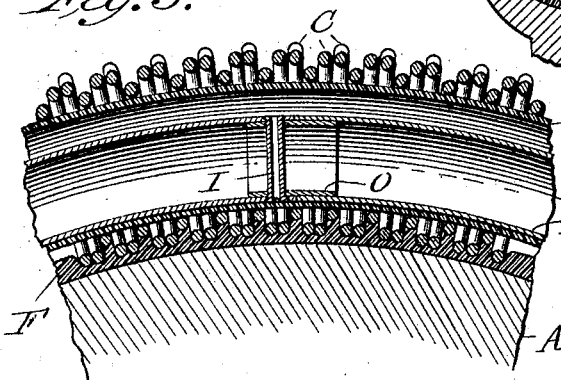
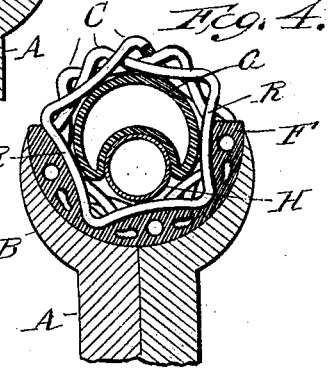
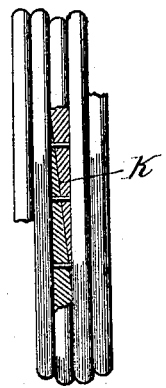
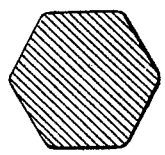
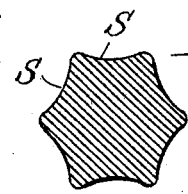
Witnesses
Edwin L. Yewell
Thomas Durant
Inventor
Joshua W. Jones
By Church & Church
his Attorneys No. 800,112. PATENTED SEPT. 19, 1905.
J. W. JONES.
TIRE FOR VEHICLE WHEELS.
APPLICATION FILED DEC. 30, 1904.
2 SHEETS—SHEET 2.
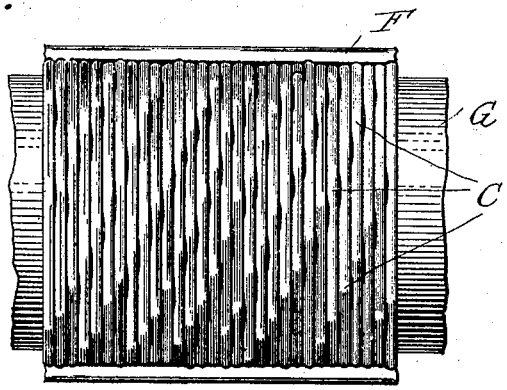
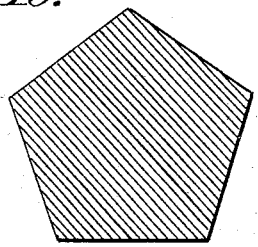 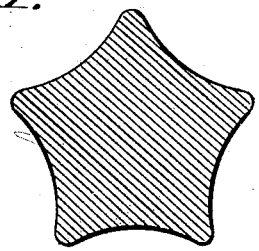
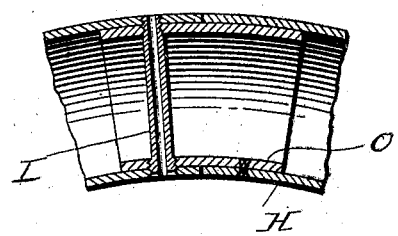
Witnesses
Edwin L. Yewell
Thomas Durant
Inventor
Joshua W. Jones
By Church & Church
his Attorneys

UNITED STATES PATENT OFFICE.

JOSHUA W. JONES, OF HARRISBURG, PENNSYLVANIA.

TIRE FOR VEHICLE-WHEELS.

No. 800,112.  Specification of Letters Patent.  Patented Sept. 19, 1905.

Application filed December 30, 1904. Serial No. 238,948.

*To all whom it may concern:*

Be it known that I, JOSHUA W. JONES, a citizen of the United States, residing at Harrisburg, in the county of Dauphin and State of Pennsylvania, have invented certain new and useful Improvements in Tires for Vehicle-Wheels; and I do hereby declare the following to be a full, clear, and exact description of the same, reference being had to the accompanying drawings, forming a part of this specification, and to the letters of reference marked thereon.

This invention relates to improvements in elastic tires for vehicle-wheels, the objects of the invention being to provide an elastic metallic tread-surface capable of withstanding hard wear and heavy strains and at the same time of such character as to afford a maximum traction and resistance to slipping or skidding.

Primarily the invention consists in a tire embodying an inclosing metallic casing formed by coiling a wire, rod, or strip into an irregular spiral or helix, the irregularities being in the form of bends more acute than the curvature of the spiral or helix and the bends in adjacent convolutions being out of alinement with each other longitudinally of the tire.

The invention further consists in certain novel details of construction and combinations and arrangements of parts, all as will be now described, and pointed out particularly in the appended claims.

Referring to the accompanying drawings, Figure 1 is a side elevation of a section of a wheel rim and tire embodying the present invention. Fig. 2 is a transverse section through the same. Fig. 3 is a section longitudinally of the tire. Fig. 4 is a transverse section through a tire, showing a modification of the invention. Fig. 5 is a similar section showing still another modification. Fig. 6 is a detail showing one way of uniting the ends of the rod, strip, or wire. Figs. 7 and 8 are diagrammatic views of six-sided mandrels on which the rod, strip, or wire may be wound. Fig. 9 is a plan of a section of tire which was wound on a five-sided mandrel. Figs. 10 and 11 are views of five-sided mandrels. Fig. 12 is a detail of a joint in the retainer.

Similar letters of reference in the several figures indicate like parts.

In said drawings the letter A indicates a section of a wheel such as may be used on an autovehicle and having a concave rim or felly B, preferably made sectional to permit of the ready removal or placing of the tire or tread-surface. The tread-surface of the tire in accordance with this invention is formed of a section or sections of rod, strip, or wire wrapped closely into substantially spiral form; but instead of a regular formation each convolution is provided with kinks or bends C, constituting projections or protuberances above the general contour of the tire, and the bends or projections on succeeding convolutions are out of line with each other longitudinally of the tire. The effect of such construction is to form a tire the wearing-surface of which is practically composed entirely of a succession of slight projections, which will greatly increase the wearing qualities and grip of the tire on the road and at the same time the requisite elasticity will be afforded by the resiliency of the rod, strip, or wire itself.

The particular method of forming the tire is immaterial; but it is preferred to wrap the rod, strip, or wire spirally about a properly-shaped mandrel—such, for instance, as shown in Figs. 7 and 8—allowing the inherent resiliency of the metal to uncoil the rod, strip, or wire sufficiently to move the more angular portions or projections out of alinement with each other. Practically it is found that the resiliency of the metal will cause successive convolutions to uncoil somewhat less than the distance between two bends or projections, and hence the tread-surface of the tire will have the projections distributed over its entire surface. Obviously the number of bends or projections in each convolution may be greatly varied and from three to any number may be successfully employed. If desired, the projections may be made more angular or with concave sections between the bends, as by winding the rod, strip, or wire on a mandrel having concave faces. (See R and S, Figs. 4 and 8.) It is also obvious that the cross-section of the rod, strip, or wire may be varied to suit particular requirements, (thus in Fig. 5 it is shown square;) but I do not wish to be limited to the use of rod, strip, or wire of any particular cross-sectional form. The tread-surface of the tire thus formed has a general cylindrical cross-sectional contour; but the surface instead of being smooth is rough and of such character as to give a good grip on the road, and at the same time the tread is sufficiently uniform and elastic to cause the vehicle to ride smoothly, even though the surface of the road be rough and irregular.

The concavity of the felly should approximately conform to the curvature of the tire; but an elastic backing or pad F is preferably interposed between the tire and felly to give additional elasticity and afford a seat for the convolutions of the rod, strip, or wire forming the tread-surface. This elastic pad may be of rubber, fibrous, or other material and cellular or not, as desired, the only requisites being that it shall be capable of being secured in the felly and afford an elastic seat for the tire.

The tread-surface formed as described may be used as a cover for any suitable internal tubular, elastic, or cellular filling. Thus in the drawings an internal elastic tube G is shown, which, besides affording resiliency, will prevent dirt from working between the convolutions and accumulating within the tire.

To hold the tire in place, an internal band or retainer may be employed—such, for instance, as the tubular band or ring H, the ends of which are held together by being overlapped, (see sleeve O,) through which overlapped parts a screw-bolt I may be passed. The bolt is preferably itself tubular, so as to permit of its being slipped on a wire or rod, which latter may be passed between the convolutions of the tire to direct the bolt into its proper aperture in the retainer.

The retainer may be located inside of the elastic internal tube, as in Figs. 1, 2, and 3, or the tube or filling may be outside of the retainer, as in Fig. 4. In any event a retainer of relatively large cross-section and tubular is preferred, so as to afford great strength, a wide bearing, and resistance to lateral deflection.

While the tread-surface is preferably formed by a single length of rod, strip, or wire with the ends united, preferably by being scarfed and riveted, as at K in Fig. 6, it may be formed of a number of sections united.

In use should the tread-surface become worn it may be turned to present a new surface to the outside and the tire reassembled in the rim.

Having thus described my invention, what I claim as new, and desire to secure by Letters Patent, is—

1. A vehicle-tire embodying a tread-surface formed of metal strip or wire extending around the tire, with projections thereon, the projections on adjacent sections being out of line longitudinally of the tire; substantially as described.

2. A vehicle-tire embodying a tread-surface formed of metal spirals with projections thereon, the projections on adjacent convolutions being out of alinement longitudinally of the tire; substantially as described.

3. A vehicle-tire embodying a tread-surface formed of metal strands extending around the tire and having projections thereon, the projections on adjacent strands being out of alinement with each other longitudinally of the tire; substantially as described.

4. A vehicle-tire embodying a tread-surface formed of a spiral of metal having projections on each convolution, the projections on adjacent convolutions being out of alinement with each other longitudinally of the tire; substantially as described.

5. A vehicle-tire embodying a metal spiral having bends therein more angular than the general transverse curvature of the tire, the bends in adjacent convolutions being out of alinement with each other longitudinally of the tire; substantially as described.

6. A vehicle-tire embodying a tread-surface formed of a metal spiral having its convolutions close together and extending transversely of the tire, an elastic filler located within the spiral and a retainer for the spiral formed by a tubular ring; substantially as described.

7. A vehicle-tire embodying a tread-surface formed of a metal spiral having its convolutions close together and with projections thereon, the projections on adjacent convolutions being out of alinement longitudinally of the tire and an elastic filler located within the spiral; substantially as described.

8. A vehicle-tire embodying a tread-surface formed of a metal spiral and a retainer for said spiral formed by a tubular ring having overlapping ends connected by a transverse bolt; substantially as described.

9. A vehicle-tire embodying a tread-surface formed of a metal spiral and a retainer for said spiral formed by a tubular ring having overlapping ends connected by a transverse tubular bolt; substantially as described.

JOSHUA W. JONES.

Witnesses:
JOHN PAUL JONES,
WILLIAM C. ARMOR.